US011627060B2

(12) United States Patent
Chia et al.

(10) Patent No.: US 11,627,060 B2
(45) Date of Patent: *Apr. 11, 2023

(54) ACCURATE MOBILE TRAFFIC INFORMATION ACQUISITION WITH MINIMAL TRANSMISSION COST AND OPTIONAL V2V EXTENSION

(71) Applicant: International Business Machines Corporation, Armonk, NY (US)

(72) Inventors: Yeow Khiang Chia, Singapore (SG); Shiau Hong Lim, Singapore (SG); Laura Wynter, Singapore (SG)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/553,546

(22) Filed: Aug. 28, 2019

(65) Prior Publication Data

US 2019/0386899 A1 Dec. 19, 2019

Related U.S. Application Data

(63) Continuation of application No. 15/805,200, filed on Nov. 7, 2017, now Pat. No. 10,567,251, which is a
(Continued)

(51) Int. Cl.
*H04W 4/02* (2018.01)
*H04L 43/062* (2022.01)
(Continued)

(52) U.S. Cl.
CPC .......... *H04L 43/062* (2013.01); *G08G 1/0112* (2013.01); *G08G 1/0129* (2013.01);
(Continued)

(58) Field of Classification Search
CPC ....... H04L 12/26; H04L 12/721; H04L 29/08; H04L 43/062; H04L 43/0852;
(Continued)

(56) References Cited

U.S. PATENT DOCUMENTS 7,283,904 B2 10/2007 Benjamin et al.
7,356,389 B2 4/2008 Holst et al.
(Continued)

OTHER PUBLICATIONS

Lu et al, Design of Electronic Toll Collection System based on Global Positioning System Technique, IEEE, 4 pages, 2009.*
(Continued)

*Primary Examiner* — Frank Duong
(74) *Attorney, Agent, or Firm* — Daniel Morris, Esq.; McGinn I.P. Law Group, PLLC.

(57) ABSTRACT

A method (and system, apparatus, and computer product) for reporting traffic data includes, in an onboard unit installed in a vehicle, generating a traffic data report packet including information identifying a location of the vehicle in a traffic network and storing the generated traffic data report packet in a transmission queue. The onboard unit stores and maintains the generated traffic data report packet in the transmission queue with other traffic data report packets in a sequence in accordance with potential transmission times associated with each traffic data report packet. At least a portion of the traffic data report packets stored in the transmission queue is selectively transmitted, as a batch transmission to a traffic center server via a communication link.

20 Claims, 8 Drawing Sheets

Related U.S. Application Data continuation of application No. 15/010,087, filed on Jan. 29, 2016, now Pat. No. 9,843,500.

(51) Int. Cl.

| | |
|---|---|
| *H04W 4/029* | (2018.01) |
| *H04W 4/021* | (2018.01) |
| *H04W 4/46* | (2018.01) |
| *H04W 4/44* | (2018.01) |
| *G08G 1/0967* | (2006.01) |
| *G08G 1/052* | (2006.01) |
| *G08G 1/01* | (2006.01) |
| *G08G 1/09* | (2006.01) |
| *H04L 43/0852* | (2022.01) |

(52) U.S. Cl.
CPC ............. *G08G 1/052* (2013.01); *G08G 1/093* (2013.01); *G08G 1/09675* (2013.01); *G08G 1/096716* (2013.01); *G08G 1/096791* (2013.01); *H04L 43/0852* (2013.01); *H04W 4/021* (2013.01); *H04W 4/029* (2018.02); *H04W 4/44* (2018.02); *H04W 4/46* (2018.02)

(58) Field of Classification Search
CPC ..... H04L 45/12; H04L 67/1023; H04L 67/12; H07B 15/063; G08G 1/0112; G08G 1/0129; G08G 1/052; G08G 1/093; G08G 1/096716; G08G 1/09675; G08G 1/096791; H04W 4/046
See application file for complete search history.

(56) References Cited

U.S. PATENT DOCUMENTS

| | | | | |
|---|---|---|---|---|
| 7,818,114 | B2* | 10/2010 | Jacobson | G08G 1/0104 |
| | | | | 701/118 |
| 7,912,629 | B2* | 3/2011 | Sutter | G08G 1/0104 |
| | | | | 701/118 |
| 8,315,785 | B2 | 11/2012 | Okuyama | |
| 8,566,010 | B2 | 10/2013 | Sarma | |
| 9,036,509 | B1 | 5/2015 | Addepalli et al. | |
| 9,460,429 | B2 | 10/2016 | Du | |
| 9,595,139 | B1 | 3/2017 | Breed | |
| 9,852,637 | B2 | 12/2017 | Hayee | |
| 10,522,033 | B2* | 12/2019 | McClellan | G08G 1/096725 |
| 10,986,475 | B1* | 4/2021 | Grosman | G01N 21/84 |
| 2009/0243925 | A1* | 10/2009 | Kellermeier | G08B 13/14 |
| | | | | 342/357.64 |
| 2010/0287038 | A1* | 11/2010 | Copejans | G07B 15/063 |
| | | | | 705/13 |
| 2012/0173136 | A1 | 7/2012 | Ghoting | |
| 2012/0215594 | A1 | 8/2012 | Gravelle | |
| 2014/0180773 | A1* | 6/2014 | Zafiroglu | G07B 15/063 |
| | | | | 705/13 |
| 2015/0088618 | A1* | 3/2015 | Basir | G07B 15/063 |
| | | | | 705/13 |
| 2016/0148512 | A1* | 5/2016 | Menouar | H04W 24/08 |
| | | | | 340/989 |

OTHER PUBLICATIONS

Hoh et al., Virtual Trip Lines for Distributed Privacy-Preserving Traffic Monitoring, ACM, 14 pages, Jun. 20, 2008.*

Drira et al., ADCS: An Adaptive Data Collection Scheme in Vehicular Networks using 3G/LTE, IEEE, 6 pages, 2014.*

Dieudonne et al., COL: a Data Collection Protocol for VANET, IEEE, 6 pages, Jun. 2012.*

Placzek, Selective data collection in vehicular networks for traffic control applications, Emerging Technologies, 18 pages, Nov. 30, 2010.*

Remy et al., A Data Collection and Aggregation Platform for Vehicular Networks, downloadable at http://www.senouci.net/download/Publications/Conferences/2010/Senouci_LCN2010.pdf, 3 pages, 2010.*

Sanguesa et al., Sensing Traffic Density Combining V2V and V2I Wireless Communications, Sensors, 17 pages, Dec. 16, 2015.*

Baiocchi et al., Vehicular Ad-Hoc Networks sampling protocols for traffic monitoring and incident detection in Intelligent Transportation Systems, Elsevier, 18 pages, 2015.*

United States Notice of Allowance dated Oct. 7, 2019, in U.S. Appl. No. 15/805,200.

Hoh, et al., "Enhancing Privacy and Accuracy in Probe Vehicle-Based Traffic Monitoring via Virtual Trip Lines", IEEE, 16 Pages, May 2012.

Zheng, et al., "Heterogeneous Vehicular Networking: A Survey on Architecture, Challenges, and Solutions", IEEE, 20 Pages, 2015.

Lim, et al., "Efficient Real-Time Mobile Traffic Information Acquisition" IEEE, 4 Pages, 2016.

Lim, et al., "Accurate and Cost-Effective Traffic Information Acquisition Using Adaptive Sampling": Centralized and V2V Schemes, IEEE, 20 Pages, 2017.

Drira et al., "Development and Testing of a 3G/LTE Adaptive Data Collection System in Vehicular Networks", IEEE, 10 Pages, Jan. 2006.

Herrera, et al., "Evaluation of Traffic Data Obtained via GPS-Enabled Mobile Phones: The Mobile Century Field Experiment", Elsevier, 16 Pages, 2010.

* cited by examiner

| PRIORITY | LATENCY | Transmission Probability |
|---|---|---|
| Key | $L_1$ | $p1$ |
| Important | $L_2$ | $p2$ |
| Normal | $\infty$ | 0 |

ACCURATE MOBILE TRAFFIC INFORMATION ACQUISITION WITH MINIMAL TRANSMISSION COST AND OPTIONAL V2V EXTENSION

This application is a Continuation Application of U.S. patent application Ser. No. 15/805,200, filed on Nov. 7, 2017, which is a Continuation Application of U.S. patent application Ser. No. 15/010,087, filed on Jan. 29, 2016, now U.S. Pat. No. 9,843,500 B2, issued on Dec. 12, 2017.

BACKGROUND

The present invention relates to traffic information collection, and more specifically, to reducing cost of transmitting accurate, real-time traffic data to a central server via a cellular network, by using data aggregation, based on quantum transmission cost, and a form of random sampling that is based on priorities of the traffic network links, to determine whether a specific data packet is to be transmitted.

FIG. 1 demonstrates two relatively recent communications systems for vehicles on roadways, typically with at least some aspects still under development. A first communication system permits individual vehicles 102 to transmit data to a central server 104 via a backhaul, such as a cellular network 106, using On Board Units (OBUs) 108 or other equivalent devices.

Collecting traffic data in this manner is not new, since Intelligent Transport Systems (ITS) have been in various stages of development and implementation in various countries. Such traffic information systems are typically based on a plug-and-play, in-vehicle platform utilizing OBUs 108 that link vehicles with the transportation infrastructure 104 using cellular links 110. Some ITS systems permit a two-way transmission by which vehicles can receive information, typically used conventionally for such features as providing safety warnings and traffic information to drivers. In a preferred exemplary embodiment of the present invention, the OBU is capable of Global Positioning System (GPS) interface, to determine the current location of the vehicle in which the OBU is installed.

A second recent vehicular communication system depicted in FIG. 1 is the vehicle-to-vehicle (V2V) intercommunication system 112. This V2V system permits vehicles to "talk" to each other and has been under development for several years by various automobile manufacturer. In some versions, V2V permits ad hoc networks to form among vehicles, as intended to help drivers overcome blind spots, avoid accidents, etc. A V2V standard is close to being approved in the United States, with discussion to make it mandatory by 2017.

The basic approach of acquiring traffic information via technologies such as ITS has been considered as attractive compared to other alternatives, due to its flexibility and potentially very wide coverage with essentially no additional infrastructure requirement.

However, the present inventors have recognized that potentially high cost can be incurred in the conventional ITS-like systems due to the following challenges:

Sufficient amount of data needs to be collected such that the traffic information derived on the central server achieves the required accuracy and network coverage. The collected traffic data must be transmitted to the server with low latency, such that the derived traffic information satisfies a given real-time requirement.

Each cellular transmission is charged based on a minimum charging unit (e.g. $x per y-KB). To minimize cost, it would be ideal if each OBU would transmit collected data in batches, aligning the batch size with the minimum charging unit. However, waiting for a full batch of data may result in excessive delay, affecting the real-time requirements.

The present invention provides a solution to these newly-recognized problems recognized as due to conflicting aspects in making network traffic data reports in management systems using reports from vehicles.

SUMMARY

According to embodiments of the present invention, a new scheme for cost-effective acquisition of accurate real-time vehicle traffic information by vehicular communications systems is provided, using a new combination of elements having several novel aspects and elements, including aspects of reducing data content of the data transmissions from vehicles, reducing the number of transmissions from vehicles, and aggregating data for each transmission.

The present invention can be demonstrated as reducing the cost of transmitting such network traffic data on a cellular network by using a reduced number of transmissions, as achieved by using a random number generator output value to determine whether a specific data packet will be transmitted at its predetermined reporting time.

Cost is further reduced by using a data aggregation mechanism to accumulate a preset amount of data for each transmission that does occur. In one exemplary embodiment, data aggregation can also optionally include data collected from other vehicles, using a novel application of vehicle-to-vehicle V2V intercommunication.

Although the present invention builds upon traffic reporting systems currently under development, it provides a new, more efficient method to acquire traffic data in a central server(s), as demonstrated by mathematical modeling of the method, as described in some detail herein but as further described in a technical paper to be published shortly by the present inventors. The benefit of this new method is demonstrated by simulation testing relative to known baseline methods currently used or under development.

BRIEF DESCRIPTION OF THE DRAWINGS

FIG. 4 illustrates an exemplary priority table 400 used to set a probability level in the test for whether a transmission from an OBU should occur to the traffic control center server;

DETAILED DESCRIPTION

Figure 1:
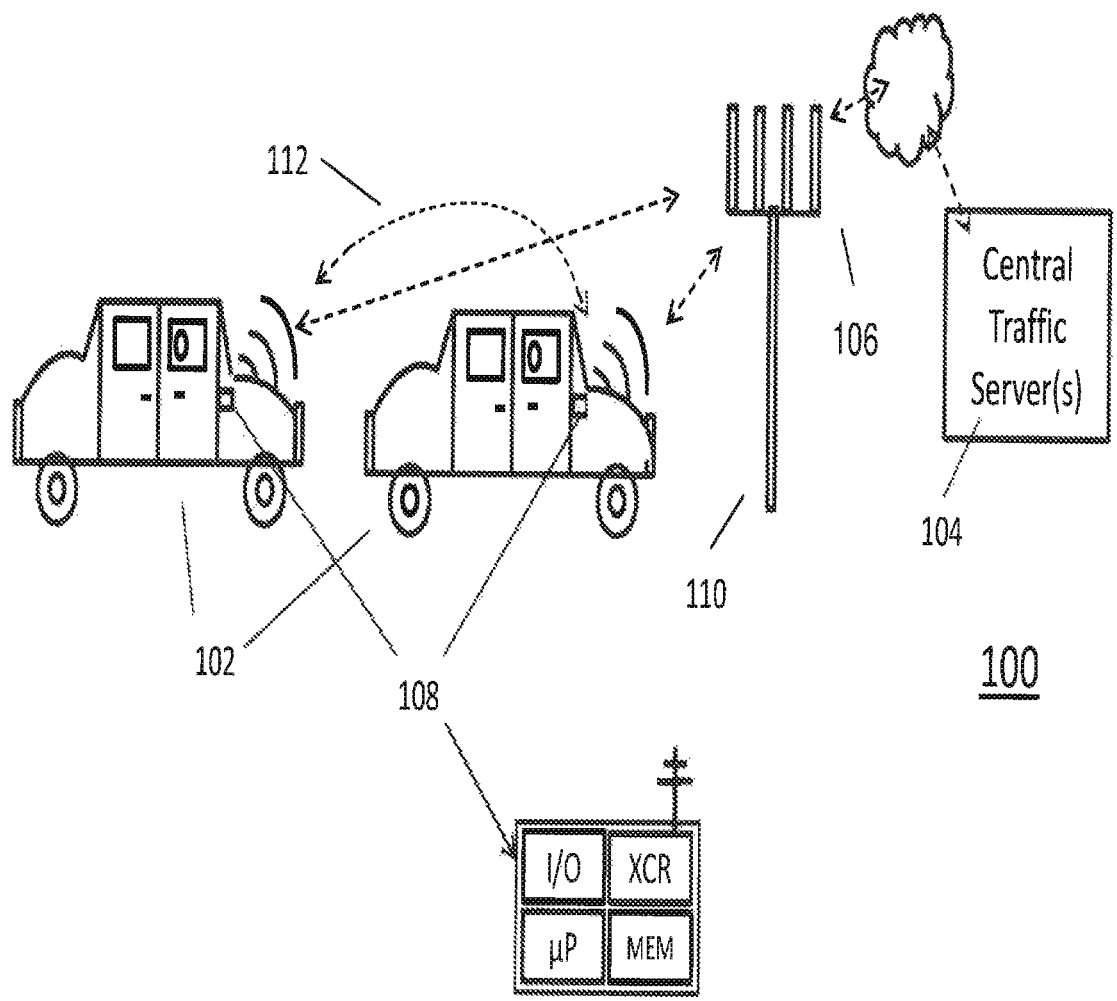
FIG. 1 exemplarily illustrates traffic data collection 100 via OBUs and the technique of V2V intercommunication.

With reference again to FIG. 1, in an exemplary embodiment, the present invention modifies this OBU-based system 100 to incorporate random sampling and data aggregation in a novel way to minimize transmission cost while achieving a given accuracy requirement in the acquired traffic information including, for example, average speed and volume.

The present invention thereby provides a scheme that addresses the newly-recognized, above-described challenges by employing the following exemplary ideas:

Adaptive random sampling: The present invention achieves a target sampling rate that can be adjusted depending on traffic load and accuracy requirements.

Prioritization: A priority queue is used to store collected traffic data where different sampling rate and latency requirements can be imposed on different types of links. Cost savings can be achieved by differentiating between key links that have stricter real-time requirement and other links that can tolerate a higher latency.

Data aggregation: Instead of immediate transmission, collected traffic data are stored in the queue and transmitted in batches. The timing and rate of transmission adapt to the desired target sampling rate while satisfying the real-time requirement. The batch size can be adapted to match the batch size of a minimum transmission cost.

V2V extension: An optional extension to the basic concepts of the present invention exploits vehicle-to-vehicle communication capability via technology such as Dedicated Short Range Communications (DSRC), to optionally achieve further cost savings by pooling data from neighboring vehicles. A simple and robust protocol that can be used in conjunction with other V2V communications is described herein.

The present invention provides a unique and systematic integration of the above ideas into a scheme that is easy to implement, with very modest resource requirements, since at least some versions of conventional OBUs can be easily updated with software modifications that implement the methods of the present invention.

Priority Based Sampling

A priority-based sampling technique is incorporated in the network traffic data transmission mechanism of the present invention, as designed to reduce the overall cost of communications through a combination of two schemes: (1) Probabilistic transmissions of samples, and (2) Optimization of buffer queues.

Probabilistic Transmission of Samples for Each Vehicle on Each Link:

For every link that the vehicle passes through, the OBU will acquire vehicle and traffic state information such as the time stamp and GPS coordinates. However, if it is desired only to estimate aggregate traffic state information such as average traffic speed, it is not necessary for all vehicles passing through a link to send out the information. Therefore, in the present invention, each vehicle decides whether to transmit its packets via the 4G network with some probability, as will be explained shortly.

Optimization of Buffer Queues for Quantum Based Cellular Charging:

For most telecommunications companies, transmission of 4G cellular data is charged according to a quantum, $x per B bits of data. The possible methods of billing for such transmission costs are beyond the scope of the present invention. Sending any data less than B incurs the same charge $x. For example, suppose the charge is $1 per kilobyte of data (B=8000), and the vehicle transmits a packet of size 20 bits only, then the vehicle is still charged at $1 for the packet that was transmitted. On the other hand, if the vehicle transmits 50 packets of size 20 bits each, it will still be charged at $1. The present inventors have recognized that this consideration means that it makes sense for the OBU to collect data up to a 1 KB packet size before transmitting a data packet to the traffic server. On the other hand, the system of the present invention also has to support near real-time output of traffic state information, which implies that data collected at an older period of time may no longer be relevant and optimally would be discarded rather than transmitted.

The present invention provides a mechanism to balance these conflicting requirements of controlling transmission cost while ensuring that sufficient traffic data is transmitted to the traffic center.

Description of the Method Residing on the OBU

Preferably, the priority-based sampling algorithm of the present invention resides on the OBU of each car participating in traffic reporting and the traffic statistics are calculated through the data collected from the vehicles in the back end central server.

Figure 2:
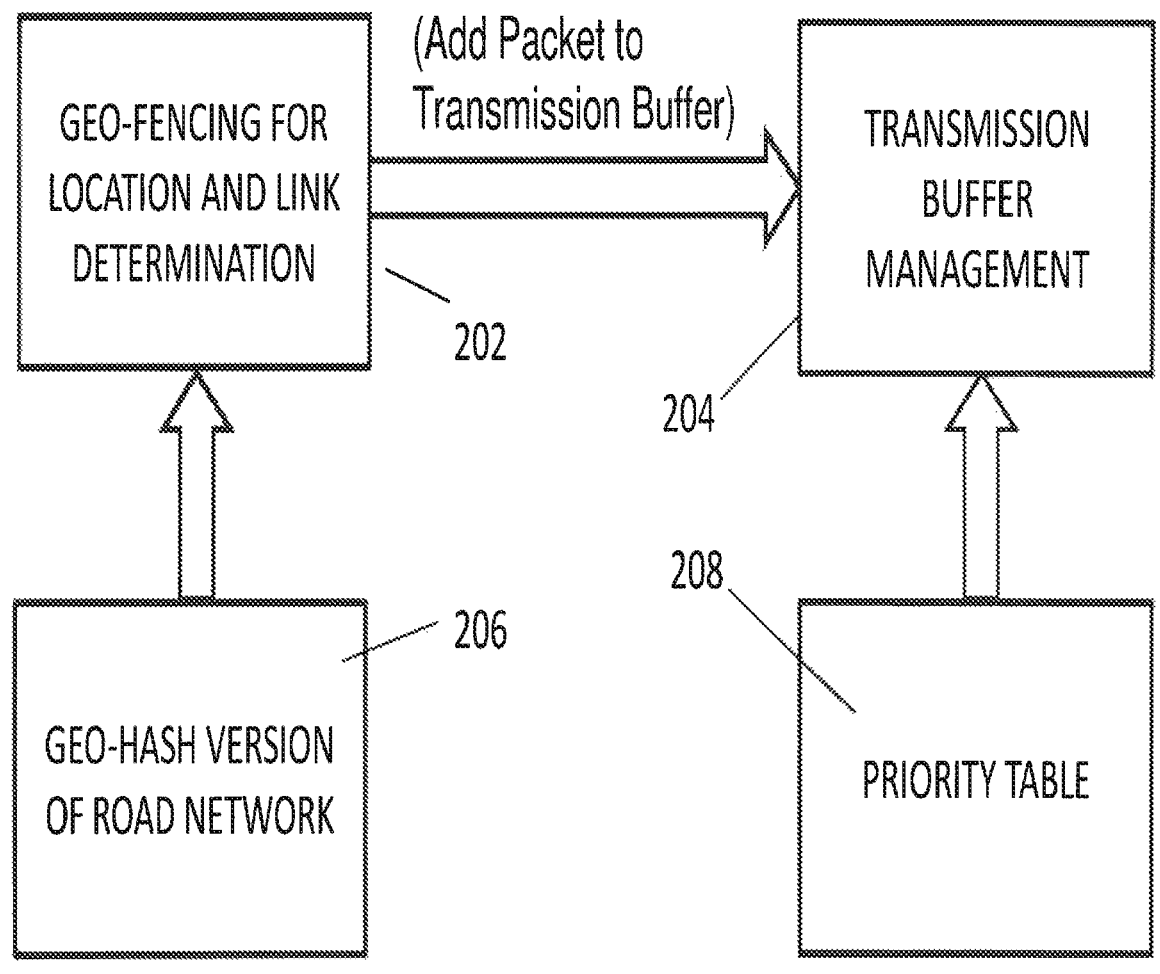
FIG. 2 illustrates in flowchart format 200 an example of the priority-based sampling method in the OBU of the present invention.

FIG. 2 shows an exemplary method 200 used at the OBU, consisting of two parts:

(i) Geo-fencing for location and link determination 202, and (ii) Transmission Buffer Management 204.

1) Geo Fencing for Location and Link Determination

This method is used to determine which link the vehicle is currently on and, from the link information, generate a packet for potential transmission to the traffic control center server. Determination of which link the vehicle/OBU is on is done through receiving GPS coordinates of for the vehicle's current location and then comparing the obtained GPS coordinates versus a geo-hashed version of the entire road network 206 stored in the OBU. Storage of the network can be done efficiently through geo-hashing, and is estimated to take no more than two MegaBytes (MB) of space. Even without geo-hashing, as a crude estimate, it can be supposed that each link on the road network is stored using its four GPS coordinates, and every GPS coordinate is stored as a 32 bit floating point number. Then, the storage requirement for a 50,000 link road network works out to 50,000×4×2×32=1.6 MB.

This storage estimate can be further reduced using simple compression schemes. For example, using geo-hashing, the first few digits in the GPS coordinates can be removed, since ID rather than vehicle GPS coordinates and provides entry/exit times relative to that specific link. Moreover, if links are concatenated in the network, then exit from one link implies entry into an adjacent link.

In one sense, the geo-fencing mechanism of the present invention can be viewed as an extension of the concept of using a sensor to detect vehicles passing through a toll collection point. A more sophisticated toll collection system could rely upon having vehicles equipped with OBUs that are GPS capable. In such toll collection systems, a toll collection point could be identified as GPS coordinates, thereby eliminating the need for structural sensors located at toll collection points.

However, in the present invention, the GPS capability of the OBU in the vehicle is used to determine when the vehicle passes pre-defined link points, as based on GPS coordinates that define links. Therefore, in contrast to the purpose of toll collection, the present invention is using this GPS-based geo-fencing mechanism for the entirely different purpose of reducing transmission cost of providing traffic data to a network traffic center.

Thus, the aim of the geo-fencing mechanism of the present invention is to identify the road link that a vehicle is currently on, as well as the entry and exit times for that link. The geo-fencing mechanism also eliminates the need to store a full map of the traffic network in the OBU since the geo-fencing mechanism merely needs to compare the vehicle's current GPS coordinates with GPS coordinates of network links, to find the closest link and thereby identify which network link the vehicle is on. This geo-fencing mechanism requires less memory than storing a full map in the OBU of the network and is more robust since it can tolerate more GPS error.

Figure 3:
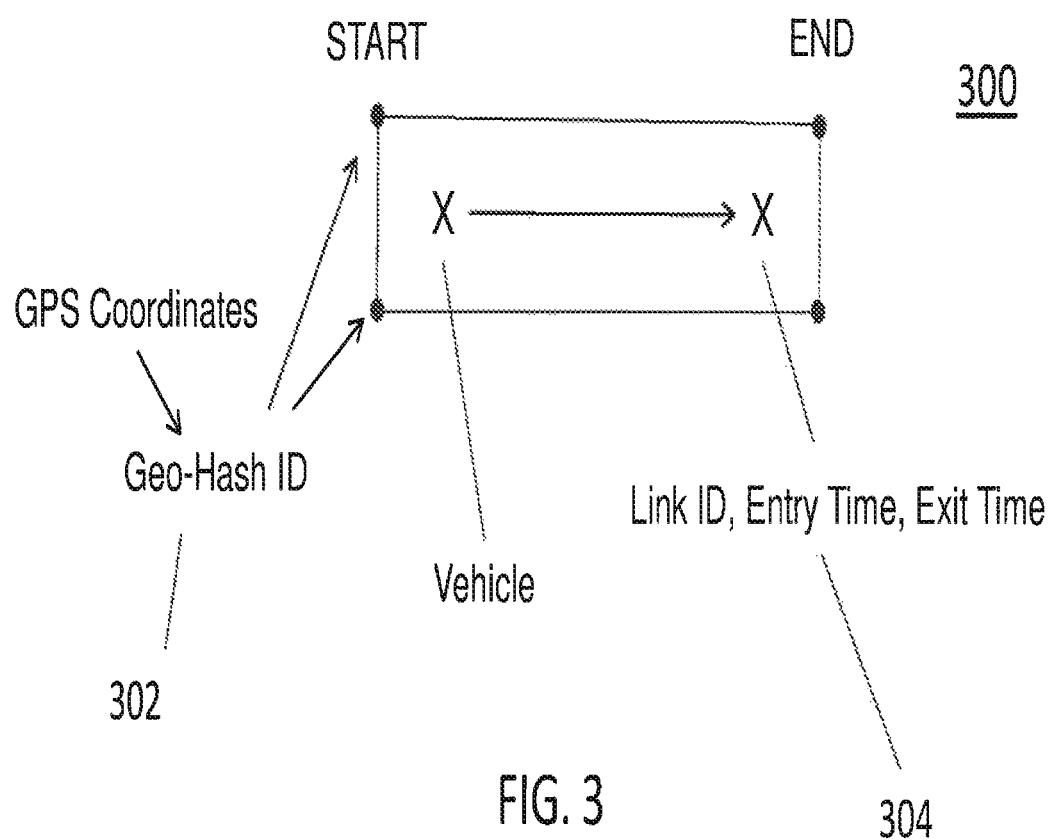
FIG. 3 illustrates an exemplary method 300 of geofencing for determining on which link of a network a vehicle is currently located.

It should also be clear of ordinary skill in the art that a "link ID" could be any code that uniquely identifies each network link, including, for example, a simple binary code stored in memory that uniquely identifies each network link. However, other coding mechanism are also possible, such as a code that identifies each network link, possibly as derived from the GPS coordinates of the link. For example, a portion of the GPS coordinates at the midpoint of the link could serve as a link ID or, as suggested in FIG. 3, a geo-hash ID of the link's two entry points.

2) Transmission Buffer Management

Once a packet 304 is generated upon exit from the link after the exit time is known, the packet is sent to a transmission buffer queue for possible later transmission to a central server, as based on a random sampling mechanism to be described shortly. Management of the transmission queue is done through a priority-based scheme that is carried out by assigning a packet latency to each type of link in the network.

This concept of link latency is a novel aspect of the present invention and not described in any current standard related to traffic reporting known to the present inventors. The latency for each type of link depends on: (1) the desired sampling rate (2) the real-time requirement. Its value can range from small (e.g., 30 secs) to large (e.g., 10 minutes). The sections below that provide more details on the underlying mathematics include more details on ways that could be used to assign the latency in view of the real-time requirement for different link types.

Determining whether the packet is transmitted when the latency is reached is done through assigning a probability of transmission to the packet. FIG. 4 shows an example of a priority table 400 (see also label 208 FIG. 2) used for assignment for a three tier priority network, key, important and normal.

For the example given in the table 400 of FIG. 4, "key" links refer to links of highest importance to the user/traffic network regulator. These can be the most frequently visited links in the network, or links in key areas of the traffic network, such as links in the central business district area or links on major highways of the city. These links are usually assigned the lowest latency, $L_1$. Hence, $L_1 < L_2$.

"Important" links refer to links that the user may be interested in, but not as critical for network operations as the key links. "Normal" links are links for which it would be good to have information on, but the user can do without information on these links. Using the example in FIG. 4 as a running example, it will now be explained how the transmission queue is operated.

Parameter Assignment and Queuing Policy

Figure 5:
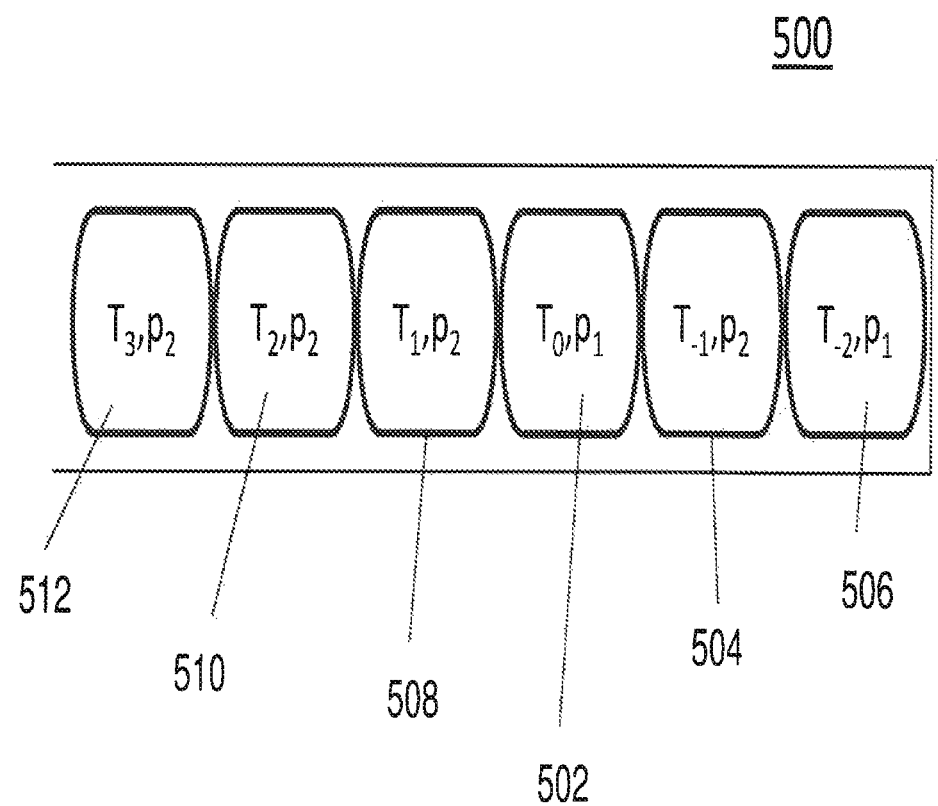
FIG. 5 illustrates adding a packet to a transmission queue 500 of an OBU in a vehicle.

When an OBU passes through a link, a packet is generated. Latency and transmission probability are assigned to the packet based on the link type. For example, if an OBU passes a link at t=0 and the link is a key link, then the latency is $L_1$ and the transmission probability is $p_1$. The time to decide whether the packet is transmitted or not, the transmission testing time, is then $T_0 = 0 + L_1 = L_1$. The packet is then added to the transmission queue and the queue is sorted according to the transmission testing time. FIG. 5 shows an example of the packet 502 being added to the transmission queue 500, with two packets 504, 506 with earlier transmission times $T_i$ than this packet, $T_{-2} < T_{-1} < T_0$, and the other packets 508, 510, 512 having a later transmission time $T_i$ than T0.

It is noted that $T_i$ is a fixed time in the future that is computed when the vehicle exits a link and generates a packet. Therefore $T_i = T_X + Li$ where $L_i$ is the latency depending on the link type. All packets in the queue are sorted by and the ordering can be arbitrary if two packets have the exact same $T_i$. As an example, suppose the vehicle exits a key link at 3 pm and key links are assigned a latency of 1 minute, then $T_i$ for this particular packet would be 3:01 pm.

Testing of Transmission

When the clock is at $T_{-2}$ (t=$T_{-2}$), the first packet in the queue is tested for transmission. Testing is done by generating a random number X~Unif [0, 1] and testing if X<p, where, in our three tier priority network, the p corresponds to either $p_1$ or $p_2$. In this exemplary embodiment, the normal links are never tested.

If X<p, a transmission is triggered. Otherwise, the packet is dropped from the queue. In the example 500 in FIG. 5, if the first two packets 504, 506 are dropped, then the inserted packet 502 is tested at time $T=T_0$. If X<$p_1$, a transmission occurs. Otherwise, the packet is dropped.

The present invention thus provides a random sampling of traffic data packets that could potentially be transmitted to the traffic center, and the random sampling mechanism takes into account the importance of each link in the network by using a probability value assigned from the priority table having different probability values based on the different types of links in the network. It should be clear that the values stored in the priority table would be easily changed, thereby making the number of transmissions for different types of links adaptable based on current conditions.

Number of Packets Transmitted

Figure 6:
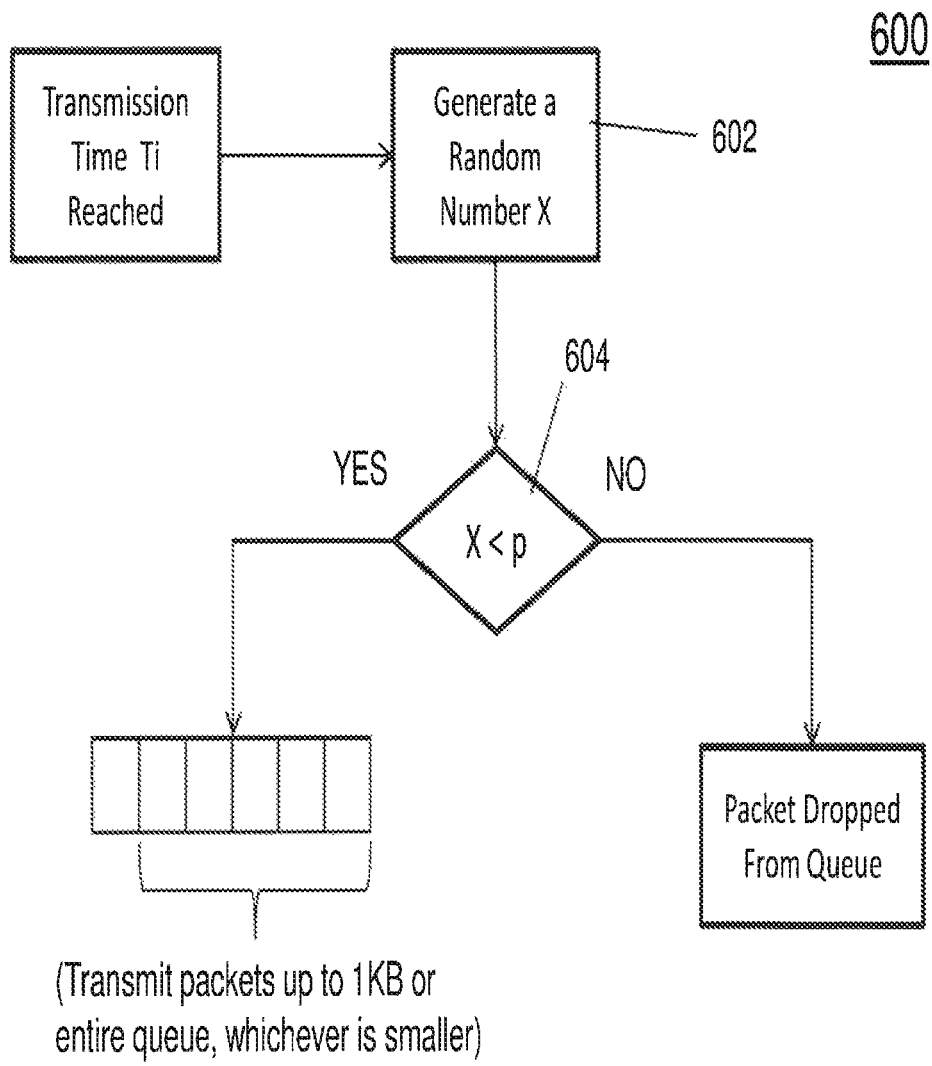
FIG. 6 illustrates in flowchart format 600 an exemplary method of testing for transmission of packets.

If a transmission occurs, packets are transmitted up to the 1 KB limit (in this exemplary embodiment), to take advantage of the assumption that transmissions are charged based on a 1 KB quantum, as a non-limiting example. Hence, not only is the packet tested transmitted, other packets further in the queue are also transmitted, up to the 1 KB limit. As the queue is sorted by transmission times, packets with shorter transmission time are assigned for transmission ahead of packets with longer transmission times. Testing and transmission of packets are summarized as shown in the exemplary flowchart 600 in FIG. 6, showing that, in step 602, a random number is generated each time a transmission time is reached, to determine whether a packet is to be transmitted or dropped, in step 604.

Method at the Central Server

The algorithm at the central server estimates the traffic information from the packets received. To illustrate the method, consider the case of estimating the average traffic speed on a road link in a window of length $T_w$ minutes. Let the realtime clock be at $t_s$. Let $T_{tol}$ be a predetermined realtime delay tolerance. We are therefore interested in estimating the average speed of all vehicles passing through that particular link between $t_s - T_{tol} - T_w$ and $t_s - T_{tol}$. For realtime estimates $T_{tol}$ would be set close to 0.

The central server finds all packets with the road link ID and with exit time between $t_s - T_{tol} - T_w$ and $t_s - T_{tol}$. For each packet i, calculate the travel time, $T_{Travel} = T_x - T_E$. It can be assumed that the length of the link $L_{link}$ is stored in the server. The speed of the vehicle corresponding to packet i is then estimated as $S_i = L_{link}/T_{travel}$. Assuming there are N packets within the time window, the average speed is computed as $\hat{S} = \sum_{i=1}^{n} S_i$. If N=0, a default speed estimate is outputted.

OBU Hardware

From the above description, it should be clear that the OBU 108 shown in FIG. 1 could incorporate concepts of the present invention in several different ways. For example, if the OBU is processor-based, as shown exemplarily in FIG. 1, the memory could store an instruction set that would be executed by a processor or microprocessor to implement steps of the invention. If the OBU 108 is a conventional OBU, such update might be achieved by, for example, downloading a set of instructions similar to the manner in which apps are commonly downloaded on portable communication devices such as mobile phones or tablets, perhaps using an I/O section that permits user inputs and provides user display information. The OBU 108 could also be based upon specialized ASIC (application specific integrated circuit) technology, in which a chip is installed that contains circuits/instructions for implementing the present invention.

It is noted that there is no requirement in terms of the number of vehicles that are equipped with OBUs or whether each OBU is running the same version of the software. The parameters in the scheme, such as the sampling rate, can be adapted to the actual number of vehicles equipped with OBU, which can be estimated based on the transmissions received. The OBU software can be updated via any internet connection (cellular/Wi-Fi), or even via V2V communications (through emerging vehicular communications protocol such as dedicated short range communication (DSRC)).

A motivating example underlying aspects of the present invention is the next-generation electronic road pricing (ERP) system in Singapore, where, by law, each vehicle will be equipped with a GPS-enabled transponder (the OBU) for real-time, adaptive road usage pricing (toll collection) and congestion control. The scheme of the present invention leverages on the envisaged widespread availability of GPS-enabled OBUs in vehicles to collect traffic information in a lightweight and cost-effective manner. The use of GPS units in vehicles to perform road pricing and toll collection is gaining in popularity worldwide, not just in Singapore, since similar schemes are being considered in other cities around the world.

Analysis of Sampling Scheme

In this section, an analysis is given of the sampling scheme for estimating the average speed. This analysis sheds light on why significant cost savings can be expected from the method of the present invention. Let S be the true average speed on a link for the time window that we are interested in. The criteria that we will adopt for this analysis is the probability that the estimate differs from the true average by more than 10 km/hr. That is, we wish to have $P(|\hat{S}-S|>10)$ to be as small as possible. In our end user's requirements, the following criteria is adopted:

$$P(|\hat{S}-S|>10) \le 0.15.$$

Suppose that the vehicles' average speed on the link are distributed according to a distribution F and that M vehicles pass through the link within the given time window. That is, $S_i \sim F$ for $i \in [1:M]$. Suppose that the sample (packet) from vehicle i is transmitted with probability p, and that we received N packets, where N follows a Binomial distribution with parameters M and p.

Then, the probability can be computed as $$P(|\hat{S}-S|>10) = P\left(\left|\frac{1}{N}\sum_{i=1}^{N}S_i - S\right| > 10\right)$$

$$= \sum_{n=0}^{M} P(N=n) P\left(\left|\frac{1}{N}\sum_{i=1}^{N}S_i - S\right| > 10 \mid N=n\right)$$

$$= \sum_{n=0}^{M} P(N=n) P\left(\left|\frac{1}{n}\sum_{i=1}^{n}S_i - S\right| > 10\right),$$

where the last line follows from the sampling being independent of $S_i$ and the random variables $S_i$ are identically distributed.

Now, the true average is given by averaging all the speeds of the vehicles passing through the link within the given time window. That is, $S = \sum_{i=1}^{M} S_i/M$. However, for large enough M (M>50) and small p (p<0.2), we will approximate this quantity by the mean of the distribution, $\mu$.

Hence, we approximate the probability as $$P(|\hat{S}-S|>10) \approx \sum_{n=0}^{M} P(N=n) P\left(\left|\frac{1}{n}\sum_{i=1}^{n}S_i - \mu\right| > 10\right) \le$$

$$P(N=0) + \sum_{n=1}^{30} P(N=n) P\left(\left|\frac{1}{n}\sum_{i=1}^{n}S_i - \mu\right| > 10\right) +$$

$$\sum_{n=31}^{M} P(N=n) P\left(\left|\frac{1}{n}\sum_{i=1}^{n}S_i - \mu\right| > 10\right) \le$$

$$P(N=0) + \sum_{n=1}^{30} P(N=n) P\left(\left|\frac{1}{n}\sum_{i=1}^{n}S_i - \mu\right| > 10\right) + P(N>30)\frac{\sigma^2}{100 \times 30}$$

where the last line follows from Cheybyshev's inequality, and we assume that we know the variance $\sigma^2$ of the distribution F.

Figure 7:
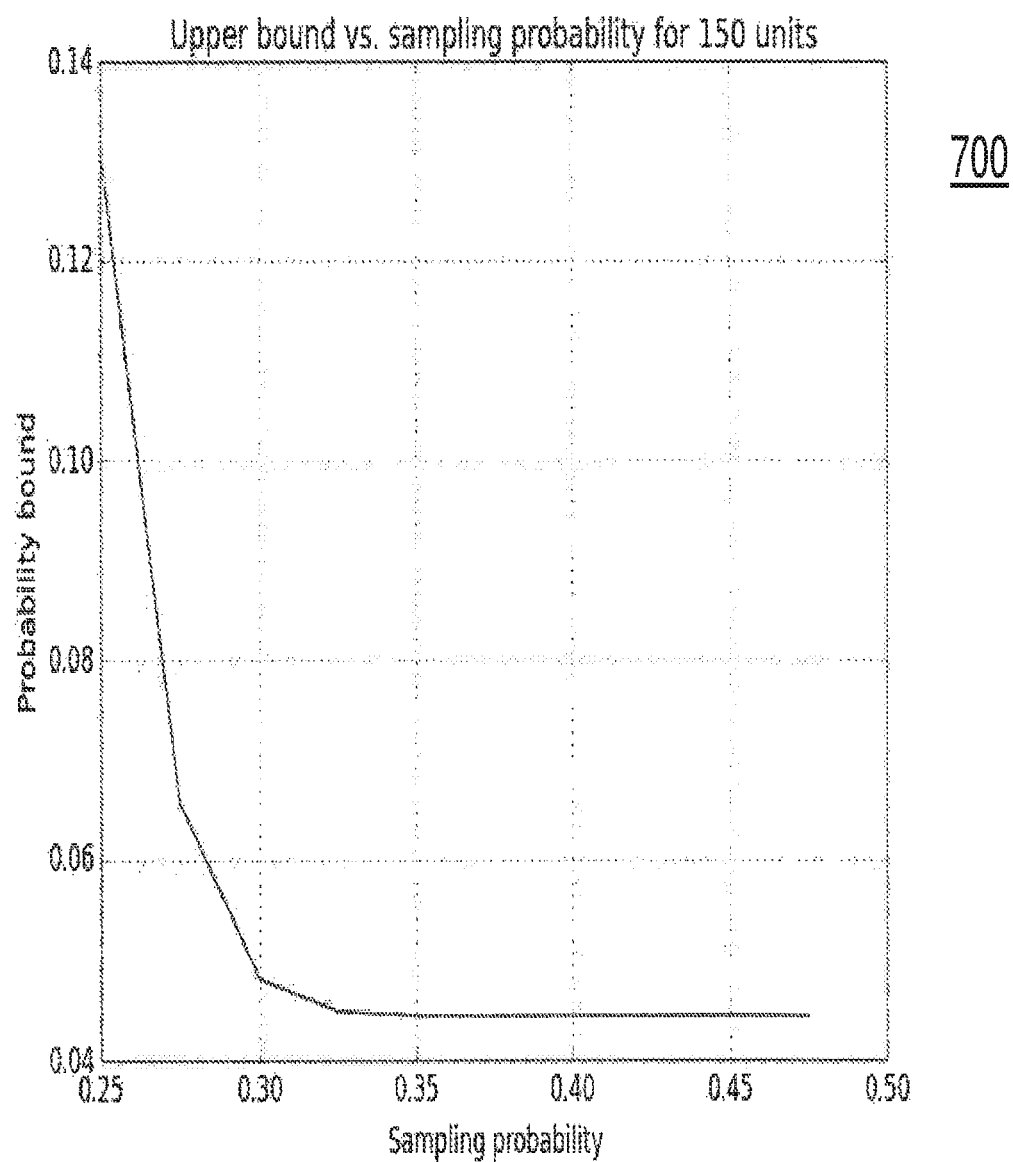
FIG. 7 shows an exemplary probability function 700 of the sampling probability for 150 OBUs.

In practice, the distribution F is unknown and we approximate it by distributions such as uniform or Gaussian. As an illustrative example, suppose the average speed $S_i$ of a specific link is uniformly distributed within the range 30 km/hr to 70 km/hr. FIG. 7 shows the probability as a function 700 of the sampling probability p for M=150.

As can be seen from FIG. 7, one can sample only 25% of the OBUs in order to obtain a performance guarantee of $P(|\hat{S}-S|<10)$ being less than 0.15 (15%).

Optimizing the Parameters of the Sampling Scheme

As described in the previous section, depending on the given accuracy requirement, an effective sampling rate r is needed. We aim to achieve this sampling rate while minimizing the overall transmission cost by choosing the right parameters for the sampling scheme. Here, we focus on the scheme with two main types of links: key and non-key (important).

Recall the four parameters of the scheme:

Transmission latency (i.e. wait time) for key links, $L_1 > 0$,

Transmission latency (i.e. wait time) for non-key links, $L_2 > 0$,

Transmission probability for key links, $0 < p_1 < 1$, and

Transmission probability for non-key links, $0 < p_2 < 1$.

Naive Scheme:

Suppose that the needed effective sampling rate for key links and important links are $r_1$ and $r_2$ respectively, and that the real-time delay tolerance ($T_{tol}$) for each link type is $\alpha_1$ and $\alpha_2$, respectively. Then a guaranteed way to achieve these requirements is to set $p_1=r_1$, $p_2=r_2$, $L_1=\alpha_1$ and $L2=\alpha_2$.

However, this scheme is too conservative since it completely ignores the fact that packet transmissions happen in batches, and not individually. Consequently the overall transmission cost can be much higher than necessary.

Optimized Scheme:

Instead of the naive scheme, we can optimize the parameters by taking into consideration the traffic pattern in the network.

We assume the following traffic model in the network. As a vehicle travels, the time interval between visits to key or non-key links is exponentially distributed with mean $\tau$. Each visit is a key link with probability q, otherwise it is a non-key link, independent of the type of previously visited link. It is not difficult to show that the time between two visits to key links is also exponentially distributed, with mean $$\frac{\tau}{q}$$

and similarly, for non-key links it is exponentially distributed with mean $$\frac{\tau}{1-q}.$$

Furthermore, the number of visits to key links in any time interval is independent of the number of visits to non-key links in the same interval, with the respective Poisson rates.

Let C be the expected transmission cost per link visit with respect to the chosen parameters $L_1$, $L_2$, $p_1$ and $p_2$. Let $\rho_1$ be the effective sampling rate for key packets and $\rho_2$ be the effective sampling rate for non-key packets. We aim to solve the following problem:

$$\underset{L_1,L_2,p_1,p_2}{\text{minimize}} C \quad (1)$$

$$\text{subject to } \rho_1 \geq r_1$$

$$\rho_2 \geq r_2.$$

We estimate $\rho_1$ and $\rho_2$ by considering the expected number of packets dropped and transmitted in each transmission. Let $i_1$ and $i_2$ be the number of key and important packets that are dropped before a transmission is triggered. Let $j_1$ and $j_2$ be the number of key and important packets that get transmitted in each transmission. Let $\Delta=L_2-L_1$. It can be shown (see section below entitled "Underlying Mathematics") that, $$E(i_1) = \frac{1-p_1}{p_1}\left(1 - e^{-\frac{p_1 q \Delta}{\tau}}\right) + \left(\frac{q(1-p_1)}{p_2(1-q)+p_1 q}\right)e^{-p_1 q \frac{\Delta}{\tau}},$$

$$E(i_2) = \frac{(1-p_2)(1-q)}{p_2(1-q)+p_1 q}e^{-p_1 q \frac{\Delta}{\tau}},$$

$$E(j_1) = \frac{qL_1}{\tau} + 1 - \frac{p_2(1-q)}{p_2(1-q)+p_1 q}e^{-\frac{p_1 q \Delta}{\tau}},$$

and $$E(j_2) = e^{-\frac{p_1 q \Delta}{\tau}}\frac{p_2(1-q)}{p_2(1-q)+p_1 q} + \frac{1-q}{p_1 q}\left(1 - e^{-\frac{p_1 q \Delta}{\tau}}\right) + \frac{L_1(1-q)}{\tau}.$$

We can therefore estimate the fraction of key packets that get transmitted by $$\frac{E(j_1)}{E(j_1)+E(i_1)},$$

and similarly $$\frac{E(j_2)}{E(j_2)+E(i_2)}$$

for non-key packets. These are however not quite the effective transmission rate since a packet that gets transmitted "too late" does not satisfy the real-time requirement and is essentially dropped. We need to further analyze the latency of each transmitted packet.

Let $T_w$ be the length of the data collection window. Let $\varphi 1=\min\{T_w, \max\{0, T_w+\alpha_1-L_1\}\}$. Assuming that the visits to each link are uniformly distributed within the time period $T_w$, the probability that a key packet gets transmitted within the real-time tolerance of the window (see section below entitled "Underlying Mathematics") is given by $$A_1 = \frac{\phi_1}{T_w} + \frac{q(T_w-\phi_1)(T_w-\phi_1+2\alpha_1)}{2T_w \tau E(j_1)}.$$

Let $\phi_2=\min\{T_w,\max\{0,T_w+\alpha_2-L_2\}\}$ and $\phi_3=\min\{T_w,\max\{\phi_2,T_w+\alpha_2-L_1\}\}$. The probability that an important packet gets transmitted within the real-time tolerance is given by $$A_2 = \frac{\phi_2}{T_w} + \frac{(\phi_3-\phi_2)(1-q)}{T_w E(j_2)}\left(\frac{L_1}{\tau}+\frac{1}{p_1 q}\right) - $$
$$(e^{\frac{p_1 q}{\tau}\phi_3} - e^{\frac{p_1 q}{\tau}\phi_2})\frac{(1-q)\tau}{T_w(p_1 q)^2 E(j_2)}e^{-\frac{p_1 q}{\tau}(T_w+\alpha_2-L_1)} + $$
$$\frac{(1-q)(T_w-\phi_3)(T_w-\phi_3+2\alpha_2)}{2T_w \tau E(j_2)}.$$

We therefore have the following estimate for $\rho_1$ and $\rho_2$:

$$\rho_1 = A_1 \frac{E(j_1)}{E(i_1)+E(j_1)}, \rho_2 = A_2 \frac{E(j_2)}{E(i_2)+E(j_2)}.$$

The overall cost of transmission can be estimated by looking at the expected number of link visits per transmission, which is given by $$V = E(i_1)+E(i_2)+E(j_1)+E(j_2) = \frac{L_1}{\tau} + \frac{1-e^{-\frac{p_1 q \Delta}{\tau}}}{p_1 q} + \frac{e^{-\frac{p_1 q}{\tau}\Delta}}{p_1 q+p_2(1-q)}.$$

The number of transmissions triggered per link visit is approximately $$\frac{1}{V}.$$

Recall that 4G transmissions are charged by a provider-defined unit. Let b be the number of data packets that fit in one charge unit, and let k be the total number of key and non-key packets in a transmission. Assuming that all packets in the queue are transmitted, then the expected number of 4G units per transmission is given by $$E = \sum_{i=1}^{\infty} iPr[(i-1)b < k \leq ib] = 1 + \sum_{i=1}^{\infty} Pr(k > ib)$$

which can be easily computed since k has a Poisson distribution with mean $$\frac{qL_1 + (1-q)L_2}{\tau}.$$

Therefore, we have $$C = \frac{E}{V}.$$

Analytical solution to the optimization problem (1) can be complicated. Instead, we can obtain an approximate solution by a simple grid search over the 4-dimensional parameter space $L_1$, $L_2$, $\rho_1$ and $\rho_2$.

That is, although an accurate solution would be possible using any of various optimization algorithms, a systematic grid search is the simplest approach and can find a sufficiently good solution in the matter of minutes. There is no need to insist on an accurate solution since the model and its parameters are only approximates of the real traffic pattern, so a coarse grid can be used. Furthermore, the gradient can be exploited to reduce the search time to just seconds, even though the problem itself is not convex.

Baseline Scheme

For the purpose of comparison we introduce a baseline scheme where transmissions happen at a fixed rate, with respect to a chosen fixed time interval $T_b$. All packets collected within the interval will be transmitted at the end of the period. On one hand, $T_b$ should be chosen large enough such that the expected number of packets is as close to the transmission charge unit as possible. On the other hand, for large $T_b$ some packets may arrive too late, depending on the delay tolerance $\alpha_1$ and $\alpha_2$. Let $\phi_1 = \min\{T_w, \max\{0, T_w + \alpha_1 - T_b\}\}$ and $\phi_2 = \min\{T_w, \max\{0, T_w + \alpha_2 - T_b\}\}$. We can show that the effective sampling rate for the baseline scheme is $$B_1 = \frac{\phi_1}{T_w} + \frac{(T_w - \phi_1)(T_w - \phi_1 + 2\alpha_1)}{2T_w T_b}$$

for key links and $$B_2 = \frac{\phi_2}{T_w} + \frac{(T_w - \phi_2)(T_w - \phi_2 + 2\alpha_2)}{2T_w T_b}$$

for important links.

The expected transmission cost per link visit for the baseline scheme is given by $$C_b = \frac{E_b}{V_b}$$

where $V_b = \frac{T_b}{\tau}$ and $E_b = 1 + \sum_{i=1}^{\infty} Pr(k > ib)$, $k \square Poisson\left(\frac{T_b}{\tau}\right)$ The optimal $T_b$ is thus selected by solving the following:

$$\underset{T_b}{\text{minimize}} \; C_b$$

subject to $B_1 \geq r_1$ $B_2 \geq r_2$.

Numerical Simulations

The performance of the techniques described above was evaluated on simulated traffic data based on a section of the actual road network in Singapore. The map for this simulation consisted of about 9000 links, each with a pre-defined speed limit. Vehicles enter the map via randomly selected points and would use the shortest path to reach a randomly selected destination. The speed of each vehicle on a link is bounded within the range [0.5 s, 1.1 s] where s is the speed limit of the particular link. Furthermore, the individual vehicle speed is subject to random but gradual changes throughout its journey. Key and important links are selected randomly from the set of most frequently visited links.

Details of this simulation and the results are not provided herein although additional details and results of this form of testing are available in the technical paper to be shortly published by the present inventors.

This testing demonstrated substantial cost savings were indeed achieved by the techniques of the present invention, relative to the existing standard solutions for traffic data reporting, considered to be the baseline for the comparison testing.

More specifically, in terms of transmission cost, the present invention consistently outperformed the baseline, while achieving similar error rates, for both speed and volume estimation. This testing also revealed that additional cost saving is achieved due to the ability to transmit less redundant data on important links.

Transmission Pooling with V2V

Further savings in transmission cost can be achieved by enabling the pooling of data via vehicle-to-vehicle (V2V) communications. This is done by enabling communication between vehicles/OBUs on the road through Dedicated Short Range Radio Communications (DSRC) protocol. V2V communications allows an OBU to aggregate packets from neighboring OBUs for transmission. Data aggregation is useful when the number of packets generated by an OBU is less than the 1 KB quantum that we assumed for charging.

In that case, the OBU can increase the utilization of the 1 KB bandwidth by pooling packets from nearby OBUs for transmission.

Figure 8:
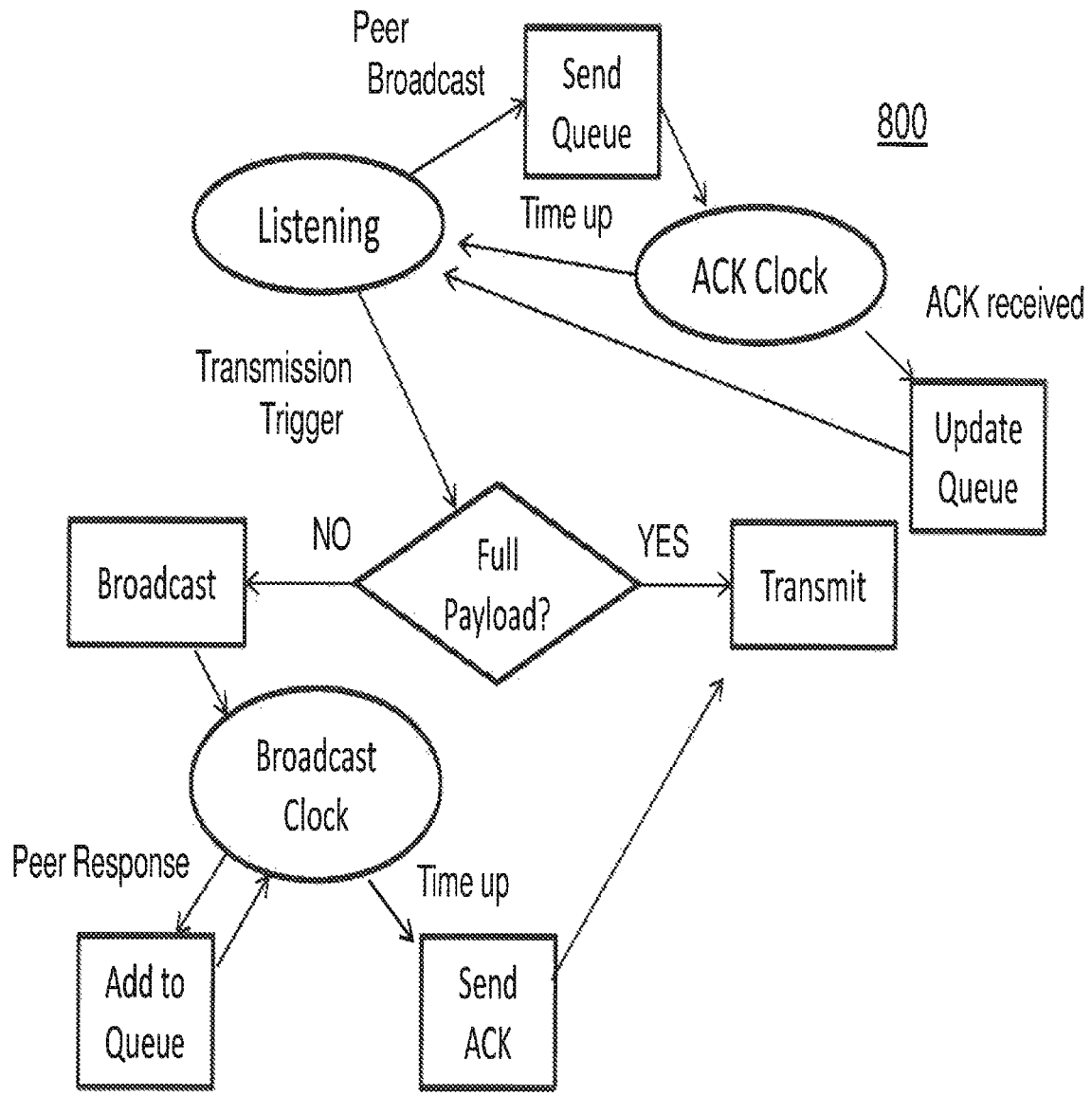
FIG. 8 shows an exemplary application of a V2V method 800 as optionally implemented in accordance with concepts of the present invention.

Our V2V scheme sits on top of our priority based sampling scheme and works on a listener and broadcaster basis. The overall scheme 800 is shown in FIG. 8, and the rest of this section describes the role of the broadcaster and the listener performed by individual OBUs. For this paper, we will not go into details of the DSRC protocol as most the details are not relevant to our scheme. It suffices for our purposes to be aware that DSRC enables V2V communications on the order of 100s of KB s over a range of about 100-200 meters.

Listener:

The listener is the default mode in the V2V scheme. In this mode, the OBU listens periodically for a SEND signal from neighboring vehicles. If a SEND signal is found, the listening OBU will transmit its transmission buffer queue, up to 1 KB, to the OBU that transmitted the SEND signal. It then starts a countdown clock with a pre-defined time window and waits for an acknowledgment signal, ACK, from the receiving OBU that its packets have been received. The listener updates its queue by removing all the transmitted packets if an ACK is received. If an ACK is not received in the pre-defined time window, the listening OBU assumes that the transmission has failed and do not delete any packets.

Broadcaster:

The second role of an OBU is that of a broadcaster. This role is activated when the OBU is about to transmit its packets. Before transmission, the OBU first checks its transmission buffer. If there are 1 KB (50 packets, assuming 20 bytes per packet) or more of data in the transmission buffer, the OBU simply sends the packets summing up to the first 1 KB. If the total number of bits in the transmission buffer queue is less than 1 KB, the OBU then broadcasts a SEND signal to neighboring OBUs. The broadcasting OBU then waits for a pre-defined time window for other OBUs to transmit their packets to it. If packets are received from another OBU, the broadcasting OBU sends out an ACK to the transmitting OBU and updates its transmission buffer queue. The received packets are inserted into the transmission buffer queue according to transmission as described in the non-V2V setup. This step is carried out for every neighboring OBU that the broadcasting OBU receives its packets from. After the predefined time window is reached, the broadcasting OBU transmits either all the packets in its transmission buffer queue, or up to the first 1 KB, whichever is smaller.

It is noted that the V2V protocol depicted in the flow-chart of FIG. 8 is a completely novel application of conventional V2V protocols. This new protocol in FIG. 8 requires a broadcast capability, which is present in existing technologies such as DSRC. As noted previously, the current focus of V2V communications is mostly on safety-related applications. The present invention uses V2V for the entirely different purpose of improving the cost-effectiveness of traffic data acquisition in an ITS-like traffic system.

Sampling Scheme for V2V

Choosing the optimal parameters for V2V can be more challenging especially when multiple priority queues are used. Here, we focus on the simplest case of a single queue, and without any RSUs in the network. In particular, only traffic data on key links have real-time requirements, packets on all other links can still be transmitted but they are not subject to any accuracy or latency requirements.

We model the effect of V2V by adding an additional parameter no, which is the expected number of neighbors at the time of a transmission broadcast. Furthermore, we assume that the queue length in each neighbor is independent and uniformly distributed.

The two parameters are the wait time L and transmission probability p. We assume that the time between two key-link visits is exponentially distribution with mean τ. The expected number of packets dropped before each transmission can be approximated by $$E(i) = \frac{1-p}{p}.$$

The expected number of packets transmitted in each transmission is approximately $$E(j) = 1 + \frac{L}{\tau}\left(1 + \frac{n_0}{2}\right).$$

Let $\phi = \min\{T_w, \max\{0, T_w + \alpha_1 - L\}\}$. The probability that a transmitted packet is within the real-time acceptance threshold is approximately $$A = \frac{\phi}{T_w} + \frac{(1+n_0)(T_w - \phi)(T_w - \phi + 2\alpha_1)}{2\tau T_w E(j)} + \frac{n_0(\alpha_1^3 - (T_w - \phi + \alpha_1)^3)}{6\tau T_w L E(j)}.$$

The effective transmission rate is approximately $$\rho = A \frac{E(j)}{E(i) + E(j)}.$$

Assuming that all packets in the neighborhood are transmitted, the expected number of 4G units is approximately $$E = 1 + \sum_{i=1}^{\infty} Pr(k > ib), k \sim \text{Poisson}\left(\frac{L}{\tau}\left(1 + \frac{n_0}{2}\right)\right).$$

The optimal parameters are thus selected by solving the following:

$$\underset{L,p}{\text{minimize}} \frac{E}{E(I) + E(J)}$$

$$\text{subject to } \rho \geq r_1.$$

Numerical Simulations

Similar to the testing summarized above for the exemplary embodiment of using a random number generator and basic data aggregation to achieve cost savings, the exemplary embodiment of adding V2V capability to further aggregate data for traffic report transmissions was also tested using numerical simulation. This testing demonstrated that the cost savings can be even more significant when using the V2V option.

Mathematics Underlying the Present Invention

For completeness, the following section provides additional details of the mathematics underlying the present invention.

A. Traffic Model

We assume that traffic data is collected on two types of links with different priorities: key and non-key. All other links are ignored. As a vehicle travels, the time interval between visits to key or non-key links is exponentially distributed with mean $\tau$. In the simplest model, each visit is a key link with probability q, otherwise it is a non-key link, independent of the type of previously visited link. It is not difficult to show that the time between two visits to key links is also exponentially distributed, with mean $\tau/q$ and similarly, for non-key links it is exponentially distributed with mean $\tau/(1-q)$. Furthermore, the number of visits to key links in any time interval is independent of the number of visits to non-key links in the same interval, with the respective Poisson rates.

The four parameters of the algorithm are:
Transmission latency (i.e. wait time) for key links, $L_1 > 0$,
Transmission latency (i.e. wait time) for non-key links, $L_2 > 0$,
Transmission probability for key links, $0 \leq p_1 \leq 1$, and
Transmission probability for non-key links, $0 \leq p_2 \leq 1$.

We refer to packets corresponding to key links (resp. non-key links) as key packets (resp. non-key packets). By definition, key packets have shorter transmission latency. We therefore assume that $L_1 \leq L_2$. This is without loss of generality since the label key and non-key can simply be swapped should we require that $L_1 > L_2$.

B. Packet Drop Probability

Consider a sequence of packets beginning at time t=0 until the first transmission. We now derive the probability of dropping $i_1$ key packets and $i_2$ non-key packets before the first transmission, for $i_1 = 0, 1, 2, \ldots$ and $i_2 = 0, 1, 2, \ldots$. Denote T as a random variable corresponding to the arrival time of the first transmitted packet. Denote K=1 the event that the first transmission is due to a key packet, and K=0 if it is due to a non-key packet. We are interested in the joint distribution $Pr(i_1, i_2, K, T)$.

We split this into three cases. Case 1 happens when the first transmission occurs at time t<L2. This can only happen when the transmitted packet is a key packet since the earliest possible transmission for a non-key packet is L2. Let $\Delta = L2 - L1$. Case 1 therefore corresponds to K=1 and T<$\Delta$.

In this case, all packets dropped must be key packets and arrive before t=T. The arrival time for the $(i_1+1)$-th key packet has distribution Gamma$(i_1+1, \tau q)$. We therefore have $$Pr(i_1, i_2 = 0, K = 1, T < \Delta) = (1-p_1)^{i_1} p_1 \int_0^\Delta \frac{\left(\frac{qT}{\tau}\right)^{i_1} e^{-\frac{qT}{\tau}}}{i_1! \frac{\tau}{q}} dT. \quad (2)$$

Case 2 happens when the first transmission occurs after t=L2 and is due to a key packet, i.e. K=1 and T$\geq\Delta$. In this case, all key packets that arrive before t=T are dropped. For non-key packets, only those that arrive before t=T-$\Delta$ will have been tested and dropped. We therefore have that, $$Pr(i_1, i_2 = 0, K = 1, T \geq \Delta) = \quad (3)$$

$$(1-p_1)^{i_1}(1-p_2)^{i_2} p_1 \int_\Delta^\infty \frac{\left(\frac{qT}{\tau}\right)^{i_1} e^{-\frac{qT}{\tau}}}{i_1! \frac{\tau}{q}}$$

$$\frac{\left(\frac{(1-q)(T-\Delta)}{\tau}\right)^{i_2} e^{-\frac{(1-q)(T-\Delta)}{\tau}}}{i_2!} dT =$$

$$\frac{[(1-p_1)q]^{i_1}[(1-p_2)(1-q)]^{i_2} p_1 q}{i_1! i_2! \tau}$$

$$e^{(1-q)\frac{\Delta}{\tau}} \int_\Delta^\infty \left(\frac{T}{\tau}\right)^{i_1} \left(\frac{T-\Delta}{\tau}\right)^{i_2} e^{-\frac{T}{\tau}} dT$$

Case 3 happens when the transmission is due to a non-key packet. For this to happen, all non-key packets before t=T must have been dropped. Also, all key packets before t=T+$\Delta$ must have been dropped. We therefore have $$Pr(i_1, i_2, K = 0) = \quad (4)$$

$$(1-p_1)^{i_1}(1-p_2)^{i_2} p_2 \int_0^\infty \frac{\left(\frac{(1-q)T}{\tau}\right)^{i_2} e^{-\frac{(1-q)T}{\tau}}}{i_1! \frac{\tau}{q}}$$

$$\frac{\left(\frac{q(T+\Delta)}{\tau}\right)^{i_1} e^{-\frac{q(T+\Delta)}{\tau}}}{i_1!} dT = \frac{[(1-p_1)q]^{i_1}[(1-p_2)(1-q)]^{i_2} p_2(1-q)}{i_1! i_2! \tau}$$

$$e^{-q\frac{\Delta}{\tau}} \int_0^\infty \left(\frac{T+\Delta}{\tau}\right)^{i_1} \left(\frac{T}{\tau}\right)^{i_2} e^{-\frac{T}{\tau}} dT.$$

Adding all three cases, we have that $$Pr(i_1) = Pr(i_1, i_2 = 0, K = 1, T < \Delta) + \quad (5)$$

$$\sum_{i_2=0}^\infty Pr(i_1, i_2, K = 1, T \geq \Delta) + Pr(i_1, i_2, K = 0) =$$

$$\frac{[(1-p_1)q]^{i_1} p_1 q}{i_1! \tau} e^{-\frac{L_1}{\tau_0}} \int_0^\Delta \left(\frac{T}{\tau}\right)^{i_1} e^{-\frac{qT}{\tau}} dT +$$

$$\left(\frac{p_1 q + p_2(1-q)}{\tau}\right) \frac{[(1-p_1)q]^{i_1}}{i_1!} e^{\frac{\Delta}{\tau} p_2(1-q)} \int_\Delta^\infty \left(\frac{T}{\tau}\right)^{i_1} e^{-\frac{T}{\tau}(p_2+q-p_2 q)} dT.$$

Similarly, we have $$Pr(i_2) = I(i_2 = 0)\left(1 - e^{-\frac{p_1 q \Delta}{\tau}}\right) + \quad (6)$$

$$\left(\frac{p_1 q + p_2(1-q)}{\tau}\right) \frac{[(1-p_2)(1-q)]^{i_2}}{i_1!} e^{-\frac{\Delta}{\tau} p_1 q} \int_0^\infty \left(\frac{T}{\tau}\right)^{i_2} e^{-\frac{T}{\tau}(1-q+p_1 q)} dT.$$

C. Expected Number of Packets Dropped Per Transmission

With the packet drop probabilities (5) and (6), we can now derive the expected number of packets dropped before the first transmission as follows:

$$E(i_1) = \sum_{i_1=0}^\infty i_1 Pr(i_1) = \frac{1-p_1}{p_1}\left(1 - e^{-\frac{p_1 q \Delta}{\tau}}\right) + \left(\frac{q(1-p_1)}{p_2(1-q) + p_1 q}\right) e^{-p_1 q \frac{\Delta}{\tau}} \quad (7)$$

and similarly $$E(i_2) = \frac{(1-p_2)(1-q)}{p_2(1-q)+p_1q} e^{-p_1 q \frac{\Delta}{\tau}} \quad (8)$$

D. Expected Number of Packets Per Transmission

For simplicity, we assume that all key and non-key packets in the queue will be transmitted whenever a successful transmission happens. Since the number of key packets generated within a time period $L_1$ is Poisson distributed with mean $$\frac{qL_1}{\tau_1},$$

the expected number of key packets per transmission is $$1 + \frac{qL_1}{\tau_1}$$

if the transmission is due to a key packet (i.e. K=1). For K=0 the expected number of key packets is $$\frac{qL_1}{\tau_1}.$$

First, we have that $$Pr(K=0) = \sum_{i_1=0}^{\infty} \sum_{i_2=0}^{\infty} Pr(i_1, i_2, K=0) = \frac{p_2(1-q)}{p_2(1-q)+p_1q} e^{-\frac{p_1 q \Delta}{\tau}} \quad (9)$$

Let $j_1$ be the number of key packets transmitted. Using (9) we therefore have $$E(j_1) = Pr(K=1)\left(1 + \frac{qL_1}{\tau}\right) + Pr(K=0)\frac{qL_1}{\tau} = \quad (10)$$

$$\frac{qL_1}{\tau} + 1 - \frac{p_2(1-q)}{p_2(1-q)+p_1q} e^{-\frac{p_1 q \Delta}{\tau}}$$

Similarly, let $j_2$ be the number of non-key packets transmitted. The expected number of non-key packets transmitted in the event K=0 is $$1 + \frac{(1-q)L_2}{\tau}.$$

In the event K=1, the expectation is $$\frac{(1-q)L_2}{\tau}$$

if $T \geq \Delta$ and $$\frac{(1-q)(T+L_1)}{\tau}$$

if $T < \Delta$. This is due to the fact that in the latter case, the transmission happens at $T+L_1 < L_2$ and only $$\frac{(1-q)(T+L_1)}{\tau}$$

non-key packets are generated in this period in expectation. We then have $$E(j_2) = Pr(K=0)\left(1 + \frac{(1-q)L_2}{\tau}\right) + Pr(K=1, T \geq \Delta)\frac{(1-q)L_2}{\tau} + \quad (11)$$

$$\int_0^\Delta Pr(K=0, T) \frac{(1-q)(T+L_1)}{\tau} dT =$$

$$e^{-\frac{p_1 q \Delta}{\tau}} \frac{p_2(1-q)}{p_2(1-q)+p_1q} + \frac{1-q}{p_1 q}\left(1 - e^{-\frac{p_1 q \Delta}{\tau}}\right) + \frac{L_1(1-q)}{\tau}$$

E. Effective Acceptance Rate

Suppose a data collection window has a period $T_w$, between time $t_0$ and $t_0+T_w$. A key packet that is generated at time $t \in [t_0, t_0+T_w]$ is accepted if its transmission time happens at some $t_1 \geq t$ and $t_1 \leq t_0+T_w+\alpha_1$, where $\alpha_1$ is a preset realtime delay tolerance for key packets. Similarly, there is a preset tolerance $\alpha_2$ for non-key packets. Packets that are transmitted beyond the delay tolerance are essentially discarded.

We assume that packet generation time for any given link is uniformly distributed within any data collection window $T_w$. Recall that a packet transmission happens when the packet at the top of the queue reaches the preset latency (i.e. wait time), L1 for key packets and L2 for non-key packets.

A key packet that triggers a transmission therefore has a delay of $L_1$. Suppose this packet arrives at t=T, then all key packets that arrive within time $[T, T+L_1]$ will get transmitted. In particular, a key packet that arrives at $t_1 \in [T, T+L_1]$ will have a delay $T+L_1-t_1$.

Similarly, if the transmission is due to a non-key packet that arrives at t=T, then a key packet that arrives at $t_1 \in [T+\Delta, T+L_2]$ will get transmitted with delay $T+L_2-t_1$. For any $0 < \beta < L_1$, due to the Poisson arrival rate, the expected number of key packets that get transmitted with delay at most $\beta$ is therefore $q\beta/\tau$. Overall, the expected number of key packets with delay $\tau$ is $q\beta/\tau$. We divide the above by $E(j_1)$ as an approximation for the probability that a transmitted key packet has delay at most $\beta$. For a fixed data collection window of size $T_w$, let $\varphi_1 = \min\{T_w, \max\{0, T_w+\alpha_1-L_1\}\}$. The probability that a transmitted key packet gets accepted can therefore be approximated by $$A_1 = \frac{\phi_1}{T_w} + \int_{\phi_1}^{T_w} \left(\frac{1}{T_w}\right) \frac{q(T_w+\alpha_1-t)}{\tau E(j_1)} dt = \frac{\phi_1}{T_w} + \frac{q(T_w-\phi_1)(T_w-\phi_1+2\alpha_1)}{2T_w \tau E(j_1)}$$

Now we look at the delay of transmitted non-key packets. For transmission due to a non-key packet, the expected number of non-key packets with delay at most $\beta$ for any $0<\beta<L_2$ is given by $$\frac{(1-q)\beta}{\tau}.$$

For transmission due to a key packet that arrives at t=T, the expected number of non-key packets with delay $\beta$ is $$\frac{(1-q)\beta}{\tau}$$

for $\beta<T+L_1$ and $$\frac{(1-q)(T+L_1)}{\tau}$$

for $\beta>T+L_1$.

Combining all cases, the expected number of non-key packets with delay at most $\beta$ is given by $$E[j_2;\beta] = \begin{cases} \dfrac{(1-q)\beta}{\tau} & \text{if } \beta \leq L_1, \\ \dfrac{(1-q)L_1}{\tau} + \dfrac{1-q}{p_1 q}\left(1-e^{-\frac{p_1 q(\beta-L_1)}{\tau}}\right) & \text{if } L_1 < \beta < L_2 \end{cases}$$

The probability that a transmitted non-key packet gets accepted can therefore be approximated by $$A_2 = \frac{\phi_2}{T_w} + \int_{\phi_2}^{\phi_3}\left(\frac{1}{T_w}\right)\frac{E[j_2;\beta=T_w+\alpha_2-t]}{E(j_2)}dt +$$

$$\int_{\phi_3}^{T_w}\left(\frac{1}{T_w}\right)\frac{E[j_2;\beta=T_w+\alpha_2-t]}{E(j_2)}dt =$$

$$\frac{\phi_2}{T_w} + \frac{(\phi_3-\phi_2)(1-q)}{T_w E(j_2)}\left(\frac{L_1}{\tau}+\frac{1}{p_1 q}\right) -$$

$$e\left(e^{\frac{p_1 q}{\tau}\phi_3} - e^{\frac{p_1 q}{\tau}\phi_2}\right)\frac{(1-q)\tau}{T_w(p_1 q)^2 E(j_2)}e^{-\frac{p_1 q}{\tau}(T_w+\alpha_2-L_1)} +$$

$$\frac{(1-q)(T_w-\phi_3)(T_w-\phi_3+2\alpha_2)}{2T_w\tau E(j_2)}.$$

CONCLUSION

From the description above, it can be seen that the present invention provides a novel solution to the newly-recognized problem of balancing the requirement to report traffic data in an ITS-like traffic reporting system with the cost of transmitting such traffic data. In the system of the present invention, the traffic data is condensed in content by using link identification derived by the technique of geo-fencing. The transmission/buffer management scheme of the present invention combines random sampling of links, identified via geo-fencing, with a priority-based queuing mechanism, to provide a new way in ITS-like traffic reporting systems to answer the questions of "when" to do the sampling test based on probability for determining if/when a report transmission should occur, "what" probability is to be used for the sampling test, and "how much" data to transmit in each data transmission. Existing schemes for data reporting in ITS-like systems are not cost effective in view of the present disclosure.

Although the exemplary embodiments were described as based upon GPS-capable OBUs and links defined as sets of GPS coordinates, the concepts of present invention are not intended as limited to such configuration details. That is, it should be clear that it is possible to implement such concepts as random sampling for determining transmission of data packets, as further based on defining different probabilities for different types of links, of storing and managing data packets for potential transmission in a transmission queue based on priority, of data aggregation for transmissions that do occur as resultant from the random sampling, and of extending V2V capability for data aggregation in traffic data reports in a traffic reporting system that does not use GPS-capable OBUs. Various concepts used in the present invention will operate in any traffic reporting system having a quantum cost of transmission for making traffic reports to a central traffic system.

The descriptions of various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    generating a data report packet including information identifying a location of a vehicle in a network; and
    storing the generated data report packet in a transmission queue, an onboard unit storing and maintaining the generated data report packet in the transmission queue with other data report packets in a sequence in accordance with potential transmission times associated with each data report packet.

2. The method of claim 1, wherein a size of a batch for a batch transmission is determined in view of a minimum size limit used to define a rate for charging for making transmissions via the communication link and further in view of a reporting latency requirement associated with a current position of the vehicle within the network,
    further comprising selectively transmitting, as a batch transmission to a server via a communication link, at least a portion of the data report packets stored in the transmission queue,
    in an onboard unit installed in a vehicle, generating the data report packet including the information identifying the location of the vehicle in the network, and
    aggregating the generated data report packet by the storing of the generated data report packet in the transmission queue.

3. The method according to claim 1, wherein positions of the vehicle within the network are indicated in the data report packets by identifying which link of a plurality of links comprising the network the vehicle has entered, and
    wherein the aggregating is based on aggregate data report packets from at least one other vehicle to form a batch for transmission to a server.

4. The method of claim 3, further comprising:
whenever a current time matches a potential transmission time for any of the data report packets stored in the transmission queue, the onboard unit generates an output value from a random number generator having parameters selectively set in accordance with different priority values of the links of the network, the random number generator using the parameters for the link associated with the potential transmission time; and
based on a comparison of the generated output value with the probability value assigned to the data report packet, the onboard unit executes one of:
drops the data report packet from the transmission queue; and
makes a transmission of the data report packet to a server via the communication link, the transmission comprising a batch transmission including other data report packets in the transmission queue, up to a preset transmission length that is based on a quantum of data associated with a charge for transmitting data via the communication link.

5. The method of claim 1, wherein the onboard unit includes a vehicle-to-vehicle (V2V) communication system capability to communicate with onboard units of other vehicles operating in the network, the method further comprising using the V2V communication system to aggregate data report packets from at least one other vehicle to form a batch for transmission to a server, and
wherein the generated data report includes packet reporting information including dividing the network into a plurality of links and assigning a priority to each link.

6. The method of claim 5, wherein the V2V communication system capability comprises a Dedicated Short Range Radio Communications (DSRC) protocol that permits the onboard unit to aggregate packets from onboard units of neighboring vehicles to form a batch for transmission to a server.

7. The method of claim 1, wherein the onboard unit is GPS-capable, wherein each link of said plurality of network links is defined as a set of global positioning system (GPS) coordinates, and wherein a geo-fencing calculation to determine on which link the vehicle is currently located, and
wherein the information includes the location of the vehicle with respect to other vehicles.

8. The method of claim 7, wherein the onboard unit performs the geo-fencing calculations to determine which link of the network the vehicle is currently located on, and
wherein the onboard unit includes a communication system to communicate with onboard units of other vehicles operating in the network, the method further comprising using the communication system to aggregate data report packets from at least one other vehicle to form a batch for transmission to a server.

9. The method of claim 7, wherein GPS coordinates associated with a link are used as the identification of that link, and
wherein the onboard unit performs the geo-fencing calculations to determine which link of the network the vehicle is currently located on.

10. The method of claim 9, wherein the link identifications using GPS coordinates of the vehicle are compressed by eliminating a predetermined number of GPS coordinate values.

11. A method of reporting data to a server, the method comprising:
generating data report packets for a vehicle travelling on a network; and
storing in a transmission queue the data report packets to form a batch of data report packets having a batch size corresponding to a batch size of a minimum transmission cost of a communication link used for transmitting data report packets to the server.

12. The method of claim 11, wherein each data report packets includes an identification of a link of a plurality of links comprising the network on which the vehicle is currently located, wherein each link of the plurality of links comprising the network is associated with a priority indicating a reporting latency necessary for that link, the method further comprising including in each data report packet a probability that associates the data report packet to the priority and reporting latency for that link, the probability to be compared with a random number to selectively determine whether that packet is to be transmitted or dropped,
aggregating the generated data report packets by the storing in the transmission queue the data report packets to form the batch of data report packets having the batch size corresponding to the batch size of a minimum transmission cost of the communication link used for transmitting data report packets to the server.

13. The method of claim 11, as adapted to a communication system in which an onboard unit of a vehicle generating a data report packet communicates with onboard units of other vehicles, the method further comprising using the communication system to aggregate data report packets from at least one other vehicle, to form batches for transmission.

14. A method of reporting data on a traffic network to a server, the method comprising:
storing data report packets as batch transmissions in order to minimize a transmission cost of transmitting the data report packets to the server over a communication link having a minimum quantum size for a transmission charge rate; and
achieving predetermined accuracy requirements for reporting information within the network, including different accuracy requirements for different segments within the network.

15. The method of claim 14, wherein the accuracy requirements for reporting information is achieved by dividing the network into a plurality of links and assigning a priority to each link, each priority having a sampling rate requirement and a reporting latency requirement,
storing data report packets comprising aggregating the data report packets as batch transmissions.

16. The method of claim 15, wherein the accuracy requirement is achieved by including in each data report packet an identification of a link on which a vehicle having an onboard unit generating a data report packet has just exited, a potential transmission time for potentially making a transmission of the generated data report packet, and a probability value as based on a priority of the identified link, and wherein the aggregating of the data report packets is achieved by storing the generated data report packets in a transmission queue of the onboard unit in an order of potential transmission times.

17. The method of claim 16, further comprising:
whenever a current time matches a potential transmission time for any of the data report packets stored in the transmission queue, the onboard unit generates an output value from a random number generator having parameters set in accordance with the priority values of the links, the random number generator using the parameters for the link associated with the data report packet having the matching potential transmission time; and based on a comparison of the generated output value with the probability value assigned to the data report packet, the onboard unit executes one of:
  drops the data report packet from the transmission queue; and
  makes a transmission to the server via the communication link, the transmission comprising a batch transmission that includes other data report packets in the transmission queue, up to a preset transmission length based on the minimum quantum size for transmission charge rate for the communication link.

18. The method of claim 17, wherein the onboard unit performs geo-fencing calculations to determine which link the vehicle is currently located, and wherein GPS coordinates associated with a link are used as an identification of the link.

19. The method of claim 18, wherein a size of each data reporting packet is reduced by compressing link identifications using GPS coordinates by eliminating a predetermined number of GPS coordinate values.

20. The method of claim 17, as adapted to a vehicle-to-vehicle (V2V) communication system in which the onboard unit of the vehicle communicates with onboard units of other vehicles, the method further comprising using the V2V communication system to aggregate data report packets from at least one other vehicle, to form a batch for transmission to the server.

* * * * *